United States Patent [19]

Batchelor

[11] Patent Number: 4,594,990

[45] Date of Patent: Jun. 17, 1986

[54] CARBURETOR FOR GASEOUS FUEL

[75] Inventor: William H. Batchelor, Hayesville, N.C.

[73] Assignee: Propane Carburetion Systems, Inc., Stuart, Fla.

[21] Appl. No.: 740,814

[22] Filed: Jun. 3, 1985

[51] Int. Cl.[4] ............................................. F02M 21/04
[52] U.S. Cl. ................................. 123/527; 123/27 GE
[58] Field of Search .................... 123/525, 27 GE, 575, 123/527; 48/189.1

[56] References Cited

U.S. PATENT DOCUMENTS

| | | | |
|---|---|---|---|
| 2,279,530 | 4/1942 | Smith | 48/180.1 |
| 2,311,315 | 2/1943 | Smith | 48/180.1 |
| 2,387,862 | 10/1945 | Smith et al. | 123/527 |
| 3,948,224 | 4/1976 | Knapp et al. | 123/3 |
| 4,308,843 | 1/1982 | Garretson | 123/527 |
| 4,465,052 | 8/1984 | Dolderer | 123/27 GE |

Primary Examiner—E. Rollins Cross
Attorney, Agent, or Firm—Bacon & Thomas

[57] ABSTRACT

A gaseous fuel carburetor includes a gas flow control valve movable both by the engine intake air stream via a vane member in the intake air duct and by a fluidic (e.g., vacuum) actuator in the valve assembly, the actuator being controllable in response to engine load demand, whereby the total gas valve opening is responsive to intake air flow and engine load. A motion damper for the valve is included, and a dual gas/liquid fuel supply system is also described wherein the air vane can be retracted to a nonobstructing position relative to the air duct when the supply of gas fuel is ceased.

31 Claims, 7 Drawing Figures

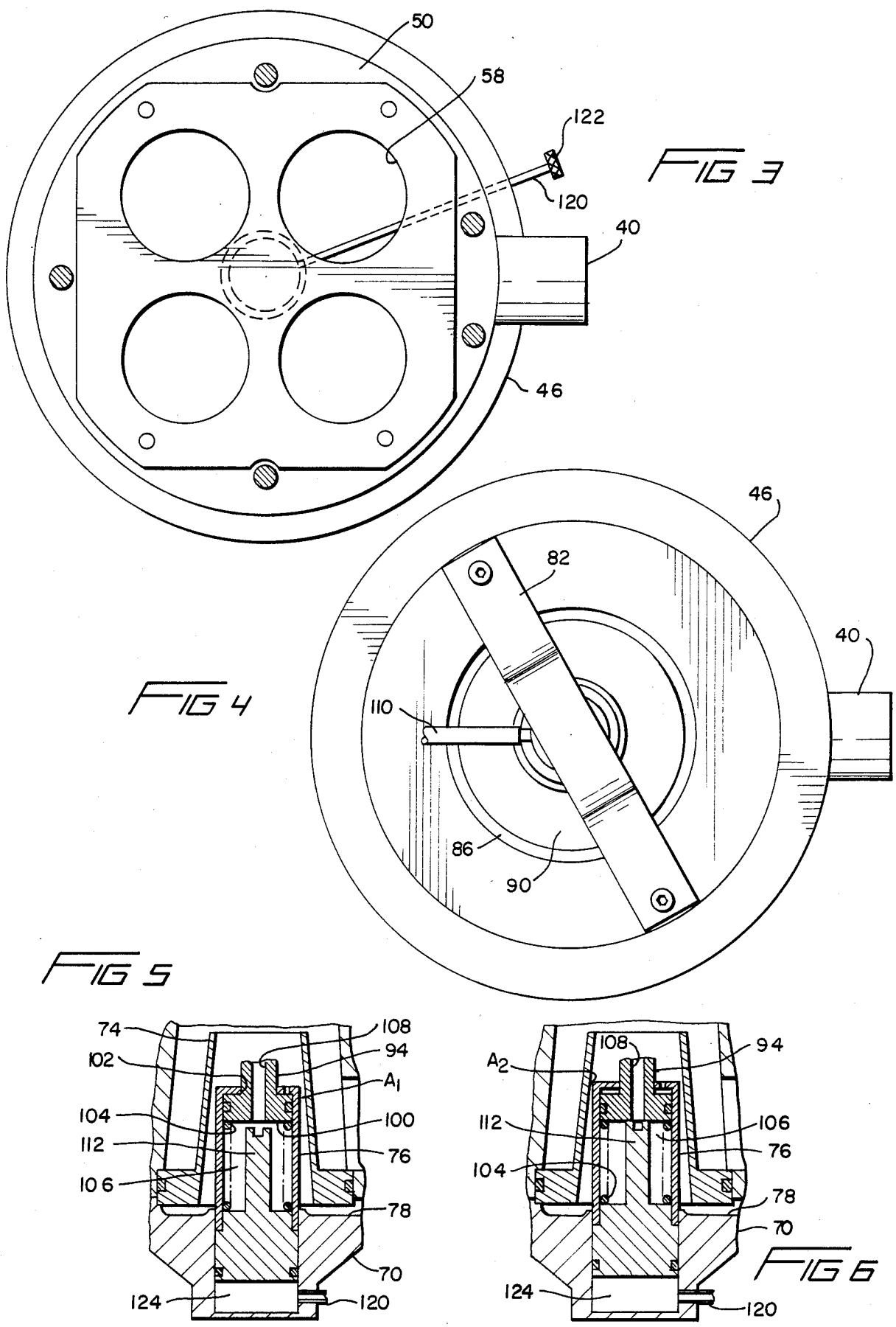

CARBURETOR FOR GASEOUS FUEL

FIELD OF THE INVENTION

This invention relates to gaseous fuel carburetors useful for the preparation of a charge for an internal combustion engine.

BACKGROUND OF THE INVENTION

1. Description of the Prior Art

Gaseous fuel carburetors useful for applications in internal combustion engines for motor vehicles have been exemplified numerous times in the prior art literature and in commercial embodiments. Descriptions of typical prior art examples can be found in U.S. Pat. Nos. 2,311,315 granted to Smith on Feb. 16, 1943; 2,387,862 granted to Smith and Paxton on Oct. 30, 1945; 3,948,224 granted to Knapp and Nesbitt on Apr. 6, 1976; and 4,308,843 granted to Garretson on Jan. 5, 1982. In accordance with these and other prior art teachings, various control systems have been proposed by which the mixing of gas fuel with engine intake air is regulated so as to produce a desired charge for the engine having a proper fuel-to-air ratio for efficient combustion under varying load demands of the engine. An objective of any such gas fuel metering system (normally characterized as a carburetor) is to provide a charge for the engine that is proper for varying engine operating conditions, particularly under circumstances where enrichment of the fuel is rapidly needed to meet the demand for higher engine torque or speed by the operator of a vehicle in which the engine is installed.

While the prior art suggests various means for controlling the fuel/air ratio of a gas fuel supply system used for internal combustion engines, including systems utilizing vacuum signals having as their source intake manifold pressure of the engine, such systems tend to be complex, costly and difficult to maintain in proper adjustment in the environment of an internal combustion engine. Moreover, such systems usually require careful calibration for each engine and they are not generally adapted to be simply retrofit on existing engines as a substitute for an existing liquid fuel carburetor or as an auxiliary carburetor for use in conjunction with existing liquid fuel carburetors constituting original engine equipment.

SUMMARY OF THE INVENTION

This invention is a gas fuel carburetor that is uniquely adapted to control the mixture of gaseous fuel with intake air supplied to an internal combustion engine through the use of a gas flow control valve that is primarily and directly responsive to the rate of flow of engine intake air and secondarily responsive to engine load demand to provide a variable fuel-to-air ratio charge mixture to the engine during its operation.

The basic valve configuration is broadly similar to that disclosed in co-owned U.S. Pat. Nos. 4,440,137 granted to the inventor named herein on Apr. 3, 1984 and 4,513,272 granted to the same inventor on Apr. 30, 1984. However, the control valves described in these patents were intended primarily for engine applications in which intake air essentially is unthrottled (e.g., fuel injected diesel engines). The present invention provides improvements in such control valves that render them particularly suitable for use in engines having intake air throttles for controlling engine speed.

More specifically, a basic control valve for gas fuel similar to that described in the inventor's related patents uses a vane member in the intake air conduit to directly control the primary position of a gas flow control valve to supply a proper proportion of gas fuel to an intake air stream drawn into the intake manifold of an operating internal combustion engine in accordance with the setting of a throttle at the inlet to the intake manifold. The air flow responsive vane member essentially reacts directly to the force of flowing intake air to set the position of the gas flow control valve while gas fuel at a regulated pressure is supplied to the upstream side of the valve. The quantity of gas admitted into the flowing intake air is ultimately determined by the effective opening provided by the valve.

In accordance with this invention, the movable valve element for controlling gas flow is furthermore controllable in response to engine load to further adjust the area of opening of the gas valve to either enrich or lean out the charge mixture independently of input motion of the air flow responsive vane member. The means for achieving this is an actuator associated with the gas valve that enables controlled adjustment of the final gas valve position. The actuator preferably is constituted of a vacuum operated fluidic motor formed within the moving valve part itself. By utiizing a lost motion and spring connection between the air flow responsive vane member and the moving valve element, the fuel valve position can be vacuum controlled independently of the setting of the air flow responsive vane member. The source of the vacuum used to control the final position of the valve is preferably the engine intake manifold at a region downstream of the throttle so that the vacuum signal to the gas control valve is responsive to engine load demand in accordance with well-known principles.

This invention also provides a unique fluidic motion damper for controlling the rate at which the control valve can be displaced during its operation to thereby prevent high speed valve flutter or sudden closing motion of the air flow responsive vane member during various engine operating conditions. In addition, the fluidic motion damper may also be used in certain applications to displace the gas valve and the air flow responsive vane member in a positive manner to a fully open position whereat the intake air conduit of the engine is substantially unimpeded. This latter feature is useful when it is desired to utilize the gas carburetor of the present invention in series with a liquid fuel carburetor provided in the path of the intake air stream.

All of the above-mentioned features are provided in the gas fuel carburetor constructed in accordance with this invention in a simple, relatively low cost, efficient system that is readily usable in a retrofit application as well as an original equipment installation.

DESCRIPTION OF THE DRAWINGS

FIG. 3 is a section view taken along line 3—3 of FIG. 2;

FIG. 4 is a plan view of the carburetor shown in FIG. 2 with the air filter removed; and FIGS. 5, 6 and 7 are sectional elevation views of the gas valve of the carburetor at different settings.

DETAILED DESCRIPTION OF PREFERRED EMBODIMENT

Figure 1:
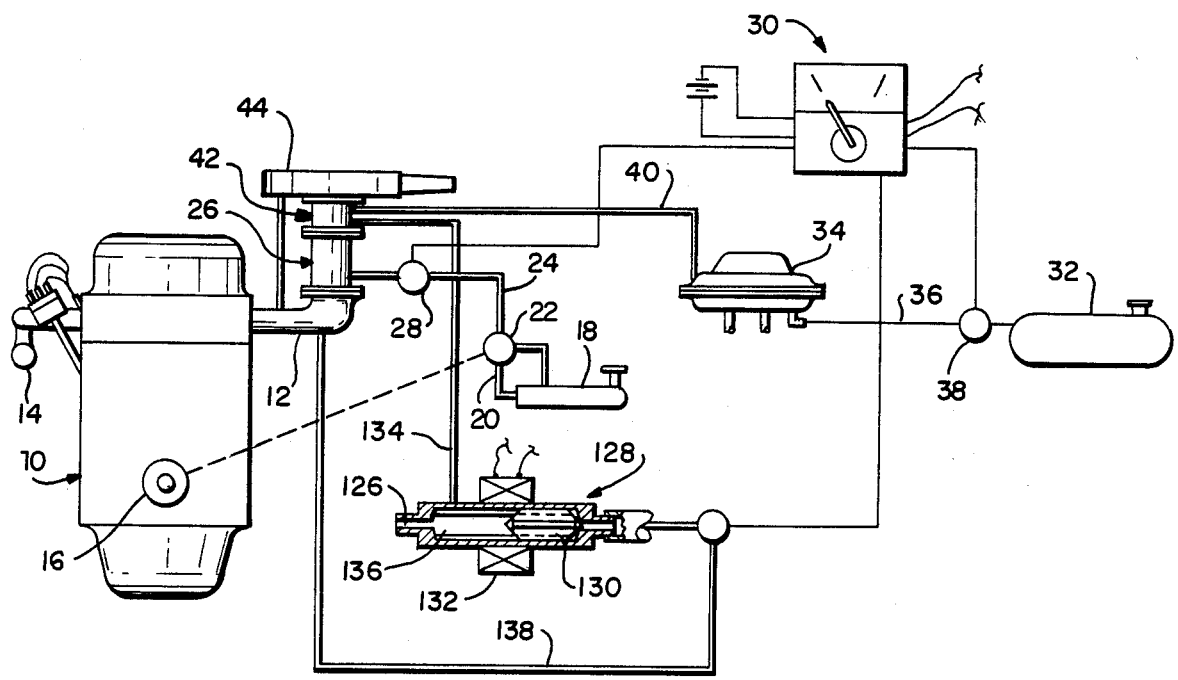
FIG. 1 is a schematic view of an embodiment of a fuel supply system in which this invention is incorporated.

With reference to the drawings, FIG. 1 illustrates schematically a dual fuel supply system for an internal combustion engine 10 including an air intake manifold 12, an exhaust manifold 14, and an output shaft 16. A liquid fuel supply source 18 includes a liquid fuel supply conduit 20 in communication with a fuel pump 22 driven by engine output shaft 16 or any other suitable means. The output of liquid fuel pump 22 is supplied to engine 10 via fuel line 24 and liquid fuel carburetor 26. A fuel shutoff valve 28 under the control of master fuel switch 30 selectively permits or blocks flow of fuel from liquid fuel pump 22 to liquid fuel carburetor 26.

It will be appreciated that the liquid fuel could be of any type usable by an internal combustion engine. In accordance with the embodiment illustrated in FIG. 1, the liquid fuel supply system and its associated carburetor are intended to be exemplary only to show that it is possible in a typical setting to use the gas fuel carburetor according to the present invention in combinatin with a liquid fuel supply system for the engine, including a typical liquid fuel carburetor. The liquid fuel supply system does not constitute a part of this invention per se and therefore no further explication is made respecting the liquid fuel supply system save for additional comments that will be made respecting the liquid fuel supply shutoff valve 28 and the master switch 30, which will be discussed in somewhat more detail below.

The gas fuel supply system for engine 10 comprises a gas fuel supply vessel 32 adapted to contain a suitable fuel that can be supplied to engine 10 in gaseous form. Such a fuel, for example, could be propane, liquified natural gas, compressed natural gas or any other suitable fuel usable in gaseous form by engine 10 through the use of a gaseous fuel carburetor or other suitable mixing valve arranged to control the supply of the gaseous fuel and air mixture to the engine in proportion to engine power demand or speed setting.

In accordance with the preferred embodiment of this invention, gaseous fuel in vessel 32 in highly compressed form (including liquified) is supplied to a vaporizer/pressure control valve 34 via gas fuel line 36. A gas fuel shutoff valve 38 controls the supply of gaseous fuel to the valve 34 under the control of master fuel control switch 30.

The vaporizer/pressure control valve 34 conventionally includes a heat exchanger (not illustrated) to completely vaporize fuel from vessel 32 supplied through line 36 and also includes one or a series of pressure control regulators to limit the output pressure of gaseous fuel to the gas fuel supply line 40 which ultimately provides gas fuel to engine 10 via gas fuel carburetor 42. It will be noted that, in accordance with the embodiment shown in FIG. 1, gas fuel carburetor 42 is upstream of liquid fuel carburetor 26 and is provided with an air filter element 44. Thus, all of the intake air to engine 10 flows through the air filter 44, gas fuel carburetor 42 and liquid fuel carburetor 26 before entering engine intake manifold 12. If only a gas fuel supply system is to be used by the engine, the liquid fuel carburetor 26 and its associated liquid fuel supply means can be dispensed with, in which case gas fuel carburetor 42 would be connected directly to air intake manifold 12 of the engine.

Figure 2:
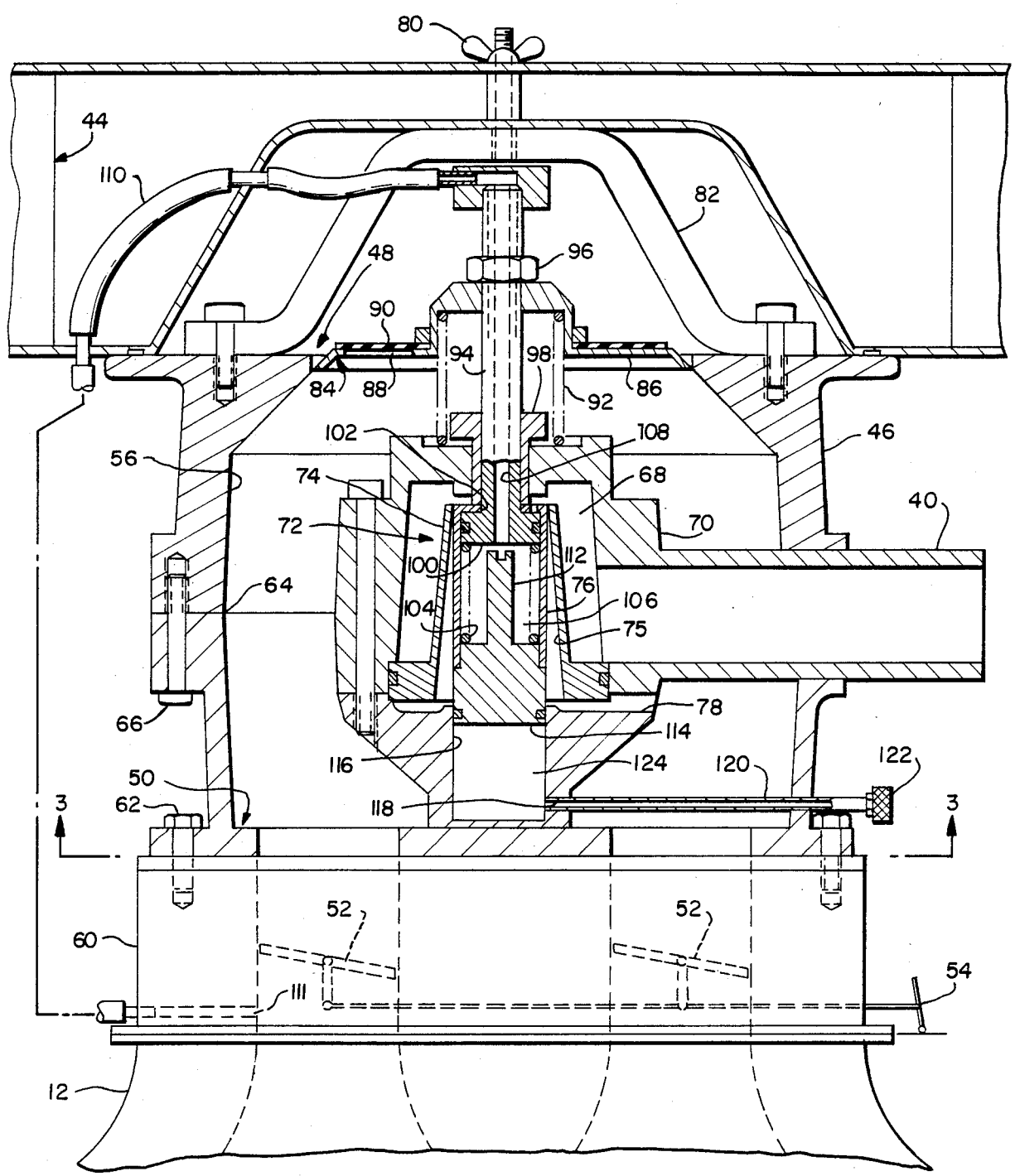
FIG. 2 is a sectional elevation view of a preferred embodiment of a gas fuel carburetor constructed in accordance with this invention.

As shown in greater detail in FIG. 2, a gas fuel carburetor constructed in accordance with this invention includes a housing 46 having an air inlet end 48 and an air/gas fuel mixture outlet end 50. In the embodiment of FIG. 2, the gas fuel carburetor has been eliminated for simplicity to show the relationship between the housing 46, air intake manifold 12 of engine 10 (see FIG. 1) and throttle plates 52. The throttle plates 52 are controllable by a movable throttle 54 operable to regulate speed and torque of engine 10. While two pairs of throttle plates 52 are usuable, in the embodiment of FIG. 2, these are to be considered as exemplary only, since a single throttle plate could also be used to regulate flow of air and fuel into intake manifold 12, provided that the intake manifold inlet was properly configured.

An intake air conduit 56 extends through housing 46 between its inlet and outlet ends 48, 50, respectively. As shown in FIGS. 3 and 4, the outlet end of housing 46 can be shaped with a suitable number of ports 58 communicating with the throttle body 60 associated with the entrance to intake manifold 12. Housing 46 is connected to the throttle body 60 in the embodiment illustrated in FIG. 2 by means of suitable fasteners 62. Any form of spacer, insulator or other apparatus commonly used in connection with carburetor assemblies can be utilized to attach housing 46 to intake manifold 12.

Housing 46, in accordance with the preferred embodiment, is constructed in two halves divided along joint 64 and retained together by fasteners 66. Within the housing 46, there is provided a gas plenum chamber 68 that is in communication with gas fuel line 40, as shown. Manifold chamber 68 preferably is formed within a hollow manifold housing 70 that includes a gas fuel valve assembly 72 within the manifold 70. The gas valve assembly 72 includes a fixed valve port 74 in the form of a tapered opening 75 and a movable valve plug 76, the port 74 comprising a fixed opening through which gas fuel can flow from manifold chamber 68 into conduit 56 within housing 46 when the valve plug 76 is moved away from the opening of port 74. The fixed port 74 preferably includes a tapered portion as shown whereby, upon motion of plug member 76 away from the opening of the port member 74 progressively opens the port 74 to the passage of gas fuel supplied through gas fuel line 40 to gas fuel manifold 68.

The lower portion of manifold 70 includes transverse openings 78 for admitting gas fuel from manifold 68 passing through the valve assembly 72 into the conduit 56 for mixing with engine intake air flowing through conduit 56. The rate at which gas flows into air conduit 56 depends upon the relative position established between the fixed and movable parts of the valve assembly 72. While a fixed port 74 and a movable plug 76 are shown in the preferred embodiment, it is to be understood that this invention could be applied as well to a reverse situation in which a port could be movable relative to a fixed plug constituting the valve assembly.

Air cleaner 44 is secured to the housing 46 adjacent the inlet end 48. Air cleaner 44 is mounted by a suitable fastener 80 to a fitting 82 secured to the inlet end of housing 46. The relationship and connecting means illustrated for the air cleaner are purely exemplary, it being understood that any appropriate form of air cleaner connection to housing 46 could be utilized.

At the inlet end 48 of housing 46 there is disposed an air flow responsive member 84 including a vane element 86 extending substantially totally across the air inlet opening to housing 46 so as to substantially block flow of inlet air into the conduit 56 when the vane 86 is in its normal at-rest position as shown in FIG. 2. Vane 86 includes apertures 88 for permitting egress of pressurized gases in intake manifold 12, such as might occur in the event of a backfire from the combustion chambers of engine 10. A suitable elastomeric or other resilient material cover 90 is disposed over apertures 88 so that only egress of air from conduit 56 is permitted through apertures 88, and not reverse flow towards the engine.

Vane 86 is normally maintained at its closed position as illustrated by a spring 92 that normally biases vane 86 towards its upper closed position. Vane 86 is mounted on rigid rod 94 by means of a connection permitted vane 86 to slide along rod 94 vertically downwardly but not upwardly beyond lock nut 96 that is threaded on the upper end of rod 94. Thus, the upper limit of travel of vane 86 is the position of nut 96 on rod 94. Spring 92 normally maintains vane 86 up against the lock nut 96 which, as will be explained in more detail below, is preset to establish a maximum upper limit of travel of vane 86 relative to housing 46.

Connector rod 94 extends vertically down through a bushing 98 and is connected to valve plug element 76 through a lost-motion connection that will be described below.

Valve plug element 76 is configured in the form of a hollow cannister which defines within its interior volume a cylinder for receiving enlarged end 100 of rod 94 in sealing and sliding relationship. The reduced portion of rod 94 extends into valve plug 76 through an aperture 102 in the top end of the plug 76 as illustrated in FIG. 2. A spring 104 within plug 76 normally biases the plug 76 and rod 94 away from each other so as to maintain the cylindrical volume 106 within plug 76 at maximum volume, with the top of the plug bearing against enlarged end 100 of rod 94. That is to say, spring 104 normally biases plug 76 so that the combination of rod 94 and plug 76 is at maximum length, considering the total length of rod 94 and plug 76 as shown in FIG. 2.

With the system at rest as shown in FIG. 2, it will be seen that spring 92 urges vane 86 upwardly against an adjustable stop nut 96 which in turn raises rod 94 to its upper limit of travel whereat the top end of plug 76 rests against the bottom of bushing 98. In this position, plug 76 virtually closes the opening in port 74 through which gas can flow into openings 78 and subsequently into air flow conduit 56. If desired, the position of bushing 98 can be adjusted to adjust the upper limit of travel of plug 76 if it is desired to preset the plug so as to provide a small effective opening in port 74 for admitting gas fuel during starting or idle conditions.

During normal operation of the gas fuel carburetor, upon cranking of the engine to start same, air flow drawn into housing 46 from intake manifold 12 impinges against vane 86 and causes same to be moved axially downwardly to provide an inlet air passageway into housing 46. Until the engine starts, motion of vane 86 is small, but adequate to permit the passage of intake air corresponding to the rate of flow of such air as is permitted by opening of throttle plates 52. Movement of vane 86 downwardly away from adjustable stop nut 96 against the bias of spring 92 immediately permits valve plug 76 to also move down in port 74 to increase its effective opening by reason of the suction effect of air flowing through conduit 56 past openings 78 at the lower end of manifold 70.

Conduit 56 preferably is formed so that there is a small restriction to air flow in the vicinity of manifold 70, particularly in the region of openings 78, thereby creating a pressure differential between air flow conduit 56 and gas fuel manifold 68 upon the passage of intake air through conduit 56. The combined effect of the lower air pressure adjacent openings 78 and the pressure of the gas fuel in inlet line 40 serves to effectively cause valve plug 76 and rod 94 to virtually follow the vertical movement of vane 86 in response to intake air force against vane 86. Accordingly, the effective opening of port element 74 of valve 72 opens and closes in response to downward and upward movement of vane 86, respectively, in response to greater or less flow of intake air into intake manifold 12. Opening of throttle plates 52 thus supplies additional air and fuel to engine 10 as the increased air flow moves vane 86 to a position causing an increased effective opening of gas fuel valve 72.

It will be recognized that it would be highly desirable to vary the fuel mixture richness provided to the intake air during engine operation and in particular to vary the fuel mixture in accordance with engine loading over the operating speed range of the engine. In accordance with this invention, this is accomplished by providing a fluid actuator that can fluidically move the valve plug 76 relative to the connector rod 94. Such an actuator is provided by the relationship between the enlarged end 100 of rod 94 and the interior volume 106 of valve plug 76, whereby volume 106 is variable by controlling the pressure within volume 106 via fluid conduit 108 extending through rod 94 and in communication with fluid conduit 110, conduit 108 and intake manifold 12 at a region 111 below throttle plates 52. With such an arrangement, interior volume 106 of plug 76 is in communication with the intake manifold below the throttle plates 52 whereby, upon the occurrence of sufficient vacuum in interior volume 106 to collapse spring 104, the position of plug 76 along rod 94 is varied in a direction to cause closing of the effective opening of valve port 74. An end-limit stop 112 within plug 76 (which can be made adjustable if desired) limits the maximum extent of upward travel of plug 76 relative to rod 94.

It will thus be apparent that, upon engine start-up, vane 86 moves downwardly under the influence of intake air flow to a stable position against the bias of spring 92 causing plug 76 to likewise move downwardly to set the effective open area of port 74 to cause flow of gas fuel through line 40 into air conduit 56 via openings 78. However, under low engine loading conditions, a high vacuum in intake manifold 12 will be immediately communicated to the interior volume 106 of valve plug 76 to cause upward movement of plug 76 relative to rod 94, tending to slightly close the opening of port 74 to lean out the gas fuel mixture supplied to the intake air stream. Normally, plug 76 will move upwardly until the top of stop 112 strikes against the bottom of enlarged end 100 of rod 94 and the valve plug 76 and rod 94 will move in unison in response to varying air flow through conduit 56 as sensed by vane 86 which reacts to the force of the intake air stream admitted to housing 46.

Upon opening of the throttle plates 52 to increase the speed or torque of the engine, as engine load increases the total pressure in intake manifold 12 increases, that is to say, the vacuum decreases. The interior volume 106 of plug 76 experiences the same change in pressure, which ultimately permits spring 104 to begin moving the plug 76 longitudinally along rod 94 in a direction tending to open port 74 to increase the flow of gas fuel to the intake air stream moving through conduit 56. Thus, without vane 86 changing its position (i.e., constant engine speed), fuel enrichment occurs due to the drop in manifold vacuum (i.e., increased absolute pressure) resulting from the opening of the throttle plates 52. The fuel enrichment tends to increase the speed of the engine until the throttle plates 52 are adjusted to hold engine speed at a desired operating level, under which condition the position of the valve plug 76 again stabilizes relative to rod 94 and vane 86 with an appropriate supply of gas fuel commensurate with intake air flow moving through conduit 56.

The varying relationship between rod 94 and valve plug 76 relative to valve port 74 is illustrated in more detail in FIGS. 5 and 6. As seen in FIG. 5, interior volume 106 is at maximum due to the bias of spring 104 between valve plug 76 and the enlarged end 100 of rod 94. The valve plug 76 in this condition is at its maximum end limit of travel due to the interfering relationship between the upper end of the plug 76 and the enlarged end 100 of rod 94. As shown in FIG. 5, rod 94 has already moved vertically downwardly under the influence of vane 86 so as to open effective area $A_1$ in valve port 74 for the passage of gas fuel from manifold chamber 68 to openings 78 in communication with air flow conduit 56. The relative position between plug 76 and rod 94 corresponds with a fuel enrichment position of plug 76 in that area $A_1$ is at a maximum for the relative position of connector rod 94.

In FIG. 6, interior volume 106 has been reduced by the application of higher engine vacuum in intake manifold 12 into chamber 106 via fluid conduit 108. In this condition, the effective opening of valve port 74 is shown at $A_2$, which is less than $A_1$ shown in FIG. 5. This has been caused by the upward movement of valve plug 76 relative to rod 94 due to the higher vacuum condition in the intake manifold 12 as communicated to the interior volume 106 via fluid conduit 108 in rod 94. The upward movement of plug 76 in effect restricts opening of port 74 to area $A_2$, thereby leaning out the ratio of gas fuel to air supplied to intake manifold 12.

It will be apparent that, as engine load increases and decreases over its operating speed range, the relative position of plug 76 and rod 94 will constantly be adjusted in response to engine manifold vacuum so that fuel enrichment occurs at higher engine loading.

It will be observed in FIGS. 2, 5 and 6 that valve plug 76 includes a distal end 114 disposed in close-fitting, sliding and sealing relationship within a variable volume cylinder cavity 116 in the lower end of manifold housing 70. Cylinder 116 is sealed at its opposite ends by the manifold structure at its bottom end and plug 76 at its upper end, but includes a restricted orifice 118 that provides communication between cylinder 116 and ambient via restricted conduit 120. The ambient end of conduit 120 is provided with an air filter 122 to prevent clogging of restricted conduit 120 when air flow is from ambient into the cyliner 116.

The relationship between the distal end 114 of plug 76 and cylinder 116 is such that the volume 124 in cylinder 116 is varied in direct relationship with the reciprocation of plug 76 within cylinder 116. Restricted orifice 118 prevents free fluidic communication between chamber 124 and ambient so that the rate of movement of plug 76 within cylinder 116 is restricted (preferably in both directions, but possibly in only a single direction by using a one-way restrictor) by the restriction of fluid flow through orifice 118 into and/or out of chamber 124.

Chamber 124 comprises a fluidic damping chamber for restricting the rate of motion of valve plug 76 relative to the vane 86 and connecting rod 94, and moreover restricts the rate of motion of rod 94 and vane 86 whenever rod 94 is at an end of travel limit position in plug 76.

The damper chamber 124 prevents fluttering of the plug 76 in port 74. Fluttering of valve plug 76 is intended to generally connote any undamped oscillation of the valve plug due to various influences, including gas flow through the port 74. Moreover, the damper chamber 124 also prevents sudden closure of vane 86 from an open position towards a closed position upon sudden closing of valve plates 52. Such restraint against sudden closing of vane 86 permits air to continue to flow into housing 46 through conduit 56 to lean out the gas fuel mixture being supplied from gas fuel manifold 68 into the moving intake air stream before the vaporizer/pressure regulator 34 (see FIG. 1) has restricted the flow of gas fuel through line 40. It is to be understood that the formation of the plug 76 as a cylindrical element slidably received within cylinder 116 of gas fuel manifold 70 is illustrative only of the preferred embodiment. Actually, plug 76 could be connected to a piston element or other fluid damper to achieve the same results without departing from the scope of this invention. Moreover, although orifice 118 is shown as a restricted tubular conduit 120, a restricted orifice could be provided at either end of the conduit 120 or by a different means providing communication between the damper chamber 124 and a region external to such chamber.

Figure 7:
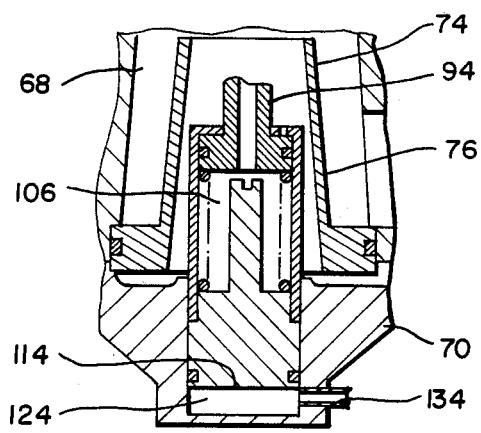

In FIGS. 1 and 7, an alternate arrangement to the damper chamber 124 is illustrated wherein chamber 124 is placed in communication with a restricted orifice at 126 which forms part of a vacuum control valve assembly 128 in a dual fuel supply system. Vacuum control valve 128, in addition to restricted orifice 126, includes a sliding plug stopper 130 having a reduced end portion as illustrated. Stopper 130 is formed of magnetic material susceptible to being influenced by solenoid winding 132 under the control of a switch such as master control switch 30.

The interior of the vacuum control valve 128 is in communication with conduit 134 which corresponds with conduit 120 in FIG. 2 in that it provides communication between damper chamber 124 and ambient. In the example of FIG. 1, however, conduit 134 provides communication between the damper chamber 124 and the interior 136 of vacuum control valve 128. The left end of the housing of control valve 128 in the specific embodiment illustrated contains the restricted orifice 126 that normally restrains free travel of valve plug 76 illustrated in FIG. 2. The right end of control valve 128 is ported to the intake manifold via conduit 138. The stopper 130 will normally close the orifice leading to conduit 138 due to the existence of a vacuum condition in intake manifold 12 but can be moved under the influence of energization of windings 132 to close restricted orifice 126 and to communicate manifold vacuum to the damping chamber 124 via line 134. It is to be noted that stopper 130 includes longitudinal flutes or openings that permit communication of manifold vacuum between the interior 136 of control valve 128 and conduit 134 leading to damper chamber 124 when stopper 130 is at its extreme left position closing restricted orifice 126. The longitudinal openings or flutes on stopper 130 normally are not in communication with manifold vacuum when stopper 130 is at its full right extreme position, as illustrated in FIG. 1, due to the provision of valve seats at the extreme ends of stopper 130.

Operation of control valve 128 will thus permit communication of manifold vacuum to chamber 124 beneath distal end 114 of valve plug 76 to cause chamber 124 to be reduced in volume to its minimum volume condition, and the movement of valve plug 76, rod 94 and vane 86 to a position causing vane 86 to be disposed in an open position relative to air flow conduit 56. An illustration of this condition is shown in FIG. 7, where valve plug 76 has been driven to its lowermost position within chamber 124 by engine intake manifold vacuum communicated to chamber 124 via line 138, control valve 128 and conduit 134. Energization of windings 132, of course, has previously moved stopper 130 to the left as shown in FIG. 1 to close restricted orifice 126 and to place manifold vacuum in communication with the interior of control valve 136 which communicates with conduit 134.

It is contemplated that vacuum control valve 128 could be utilized to permit full opening of air conduit 56 to the passage of intake air whenever desired by the operator of the engine or under other circumstances which would make it necessary or desirable to move vane 86 to a full open position relative to conduit 56. In the preferred embodiment illustrated in FIG. 1, a dual fuel supply system for engine 10 is contemplated, including a liquid fuel supply and a gaseous fuel supply, both of which have been described at the outset of this description. A master control valve 30 is provided to simultaneously manually or automatically control the position of the gas fuel cutoff valve 38, liquid fuel cutoff valve 28 and windings 132 of vacuum control valve 128. For example, in the event that the supply of gas fuel is interrupted or depleted, actuation of master control switch 30 to a liquid fuel supply mode could automatically shut down the gas fuel supply valve 38 and open the liquid fuel supply valve 28 to permit supply of liquid fuel to liquid fuel carburetor 26. Simultaneously, windings 132 can be energized transferring stopper 130 to a position placing valve plug 76 in the position shown in FIG. 7 to fully open air inlet conduit 56 in housing 46 by displacing vane 86 to a full lowered position within housing 46. Full flow of inlet air is thus admitted into liquid fuel carburetor 26 without interference by vane 86 until such time as the positions of valves 38, 28 and 128 are restored to a gas fuel mode (e.g., valve 38 open, valve 28 closed, and valve 128 deenergized to permit free communication between damping chamber 124 and restricted orifice 126). It will be appreciated that the system shown in FIG. 1 could be utilized to permit start-up of engine 10 using liquid fuel and subsequent running on gas fuel, if so desired. Master control switch 30 would simply include a "start" mode that would set the valves in starting condition to permit engine 10 to be started on liquid fuel and a "run" mode that would permit the valves to be set so that engine 10 runs on gas fuel.

It is to be understood that this description is of a preferred embodiment and that various modifications to same can be made by those skilled in the art without departing from the scope of the invention, which is defined in the claims appended below.

What is claimed is:

1. A gas fuel carburetor for an internal combustion engine having an air intake means including an intake manifold downstream of an air throttling means, comprising:
   a housing through which engine intake air flows, including an air inlet end and an air/fuel mixture outlet end, and an air flow conduit extending between said ends;
   a gas fuel manifold chamber within the housing;
   a gas fuel receiving means in communication with said manifold chamber;
   valve means for controlling the supply of gas fuel between said manifold and said air conduit, said valve means including relatively movable port and plug elements, relative movement between said port and plug elements varying the effective port opening of the valve means;
   actuating means for the valve means comprising:
   an air flow responsive member drivable in one direction by the force of intake air flowing through the housing;
   connector means extending between the air flow responsive member and the movable valve element for moving said valve element in response to movement of the air flow responsive member;
   spring biasing means for urging the air flow responsive member against the force of moving intake air; and
   a lost motion and spring-bias connection between the connector means and the movable valve element arranged so that the connector means and movable valve element are normally maintained in predetermined geometric relationship with each other at a first end stop position, but are movable relative to each other against a spring bias between the connector means and the movable valve element away from said first end stop position and up to a second end stop position;
   movement of said air flow responsive member caused by air flowing through the housing towards the engine causing motion of said movable valve element in a direction to cause progressive opening of the valve means to provide communication between said gas manifold and said air conduit; and
   means responsive to engine loading for varying the geometric relationship between the air flow responsive member and the movable valve element between said end stop positions in a manner such that the effective port area of the valve means is increased at higher engine loads for each driven position of the air flow responsive member during operation of the engine over its useful speed range.

2. A gas fuel carburetor as claimed in claim 1, said geometric relationship varying means comprising a fluid operated actuator.

3. A gas fuel carburetor as claimed in claim 2, said fluid operated actuator comprising a vacuum operated motor, and including a fluid connection means between the motor and the engine air intake manifold.

4. A gas fuel carburetor as claimed in claim 3, said vacuum operated motor comprising a variable volume chamber collapsible by subatmospheric pressure communicated to said chamber from said intake manifold sufficient to overcome the force of said spring bias between the connector means and the movable valve element to permit the relationship to be varied between said end stop positions.

5. A gas fuel carburetor as claimed in claim 4, said variable volume chamber comprising a piston within a variable volume cylinder, said piston connected to said connector means and said cylinder attached to the movable element of the valve means.

6. A gas fuel carburetor as claimed in claim 5, wherein the movable valve element is the plug and the fixed valve element is the port, said plug comprising a cannister containing said variable volume cylinder; said connector means and lost-motion connection comprising a rigid rod having a terminus extending into the cannister and into the variable volume cylinder through a sliding connection, and a piston area on the terminal end area of the rod fitting within the variable volume cylinder in sliding and sealing relationship.

7. A gas fuel carburetor as claimed in claim 6, wherein said fluid connection means comprises a conduit extending through said rigid rod.

8. A gas fuel carburetor as claimed in claim 7, wherein said cannister includes outer sidewalls and endwalls that define said variable volume cylinder.

9. A gas fuel carburetor as claimed in claim 8, including abutments within said variable volume cylinder limiting relative movement of the piston relative to the cylinder, said end stop positions comprising the limits of movement of said movable valve element relative to said connector means.

10. A gas fuel carburetor as claimed in claim 9, wherein said lost-motion and spring-bias connection comprises spring means within the cylinder normally biasing the piston towards one end limit position whereat the variable volume cylinder is at maximum volume.

11. A gas fuel carburetor as claimed in claim 10, including means for fluidically damping the motion of the movable valve means relative to the motion of the air flow responsive member.

12. A gas fuel carburetor as claimed in claim 11, said fluidic damping means comprising a cylinder means for telescopingly receiving said cannister in sliding and sealing relationship, said cylinder closed at one end to define a variable volume damping chamber closed at its opposite end by the cannister; and chamber orifice means for limiting the rate of venting of the damping chamber to ambient.

13. A gas fuel carburetor as claimed in claim 12, wherein said air flow responsive member is a vane member normally biased by the spring biasing means to substantially block air flow to the air conduit of the housing but drivable by the flow of engine intake air towards an open position to permit unimpeded supply of air to the air conduit, and including means for applying a vacuum to said damping chamber to drive the cannister towards a position reducing the volume of the damping chamber towards a minimum volume whereat said cannister, connector means and air flow responsive member are disposed at a position where the air flow responsive member is disposed at an open position relative to the air flow conduit.

14. A gas fuel carburetor as claimed in claim 13, said vacuum applying means comprising a fluid connection between a vacuum source and said damping chamber, and a vacuum control valve for controlling the supply of vacuum to the damping chamber to said fluid connection.

15. A gas fuel carburetor as claimed in claim 14, wherein said fluid connection also connects said damper orifice means to said damping chamber; said damper orifice means is controllable to an open or closed position and comprises a part of said vacuum control valve; and said vacuum control valve controls the opening and closing of the damper orifice means.

16. A gas fuel carburetor as claimed in claim 15, wherein said vacuum source is said engine intake manifold.

17. A gas fuel carburetor as claimed in claim 16, said engine including a supply source of gas fuel in communication with said gas fuel manifold chamber; an alternate liquid fuel supply system including a supply source of liquid fuel for the engine; means for switching the supply of fuel to the engine between said sources; and fuel supply control means for controlling said fuel supply switching means.

18. A gas fuel carburetor as claimed in claim 17, said fuel supply control means including a master control means arranged to selectively control in a coordinated manner said vacuum control valve and said fuel supply switching means so that when the switching means is controlled so as to direct liquid fuel to the engine, the gas fuel supply is controlled so that its supply to the engine is cut off, said damper orifice means is closed, and said vacuum control valve is controlled to move the cannister and air flow responsive member in a direction to open the air flow to the air flow conduit.

19. A gas fuel carburetor as claimed in claim 1, including means for fluidically damping the motion of the movable part of the relatively movable valve means relative to the motion of the air flow responsive member.

20. A gas fuel carburetor as claimed in claim 19, wherein said damping means includes a motion restrictor associated with the movable part of the relatively movable valve means, said motion restrictor arranged to restrict the maximum rate of displacement of the movable valve in response to input displacement force applied by the valve actuating means.

21. A gas fuel carburetor as claimed in claim 20, the movable valve part comprising a cylindrical cannister; a damping cylinder in said housing adjacent said movable valve part; said cannister slidably mounted in said cylinder in reciprocating, sealing relationship to define therein a variable volume damping chamber; a restricted damper orifice providing communication between said damping chamber and ambient; said damping chamber being sealed except for said damper orifice.

22. A gas fuel carburetor as claimed in claim 1, said air flow responsive member comprising a vane normally substantially blocking the flow of intake air to the air flow conduit, but movable by the force of moving intake air against the force of said spring biasing means to define a bypass area for admitting intake air into the air flow conduit, and actuating means for driving the vane to an open position relative to the air flow conduit independently of the flow of intake air.

23. A gas fuel carburetor as claimed in claim 22, including means for fluidically damping the motion of the movable part of the relatively movable valve means relative to the motion of the air flow responsive member.

24. A gas fuel carburetor as claimed in claim 22 or 23, said actuating means comprising a fluid motor drivably by fluid pressure differential.

25. A gas fuel carburetor as claimed in claim 24, said fluid motor comprising a vacuum driven motor; means for fluidically connecting the motor to the engine intake manifold; and vacuum control valve means for controlling the supply of vacuum from the intake manifold to the fluid motor.

26. A gas fuel carburetor as claimed in claim 25, the movable part of said relatively movable valve elements comprising a cylindrical plug; actuating cylinder means in the housing closed at one end and receiving said plug at its other end in sliding and sealing relationship to thereby define a variable volume actuating chamber for the fluid motor between its closed end and the plug; said means connecting the fluid motor to the engine intake manifold comprising conduit means between said actuating chamber and said intake manifold; said vacuum control valve including means for controlling communication of vacuum through said conduit means; whereby the supply of vacuum to the actuating chamber drives the air flow responsive member towards an open position relative to the air flow conduit.

27. A gas fuel carburetor as claimed in claim 26, said engine including a supply source of gas fuel in communication with said gas fuel manifold chamber; an alternate liquid fuel supply system including a supply source of liquid fuel for the engine; means for switching the supply of fuel to the engine between said sources; and fuel supply control means for controlling said fuel supply switching means.

28. A gas fuel carburetor as claimed in claim 27, said fuel supply control means including a master control means arranged to selectively control in a coordinated manner said vacuum control valve and said fuel supply switching means so that when the switching means is controlled so as to direct liquid fuel to the engine, the gas fuel supply is controlled so that its supply to the engine is cut off, and said vacuum control valve is controlled to move the cannister and air flow responsive member in a direction to open the air flow to the air flow conduit.

29. A gas fuel carburetor as claimed in claim 23, wherein said fluid motor and said damping means comprise a common variable volume actuating and damping chamber; and means for controlling communication of fluid pressure differential into and out of the common chamber to control the effect of the chamber on the relatively movable part of the valve means.

30. A gas fuel carburetor as claimed in claim 29, said movable part of the valve means connected to a piston means; said variable volume actuating and damping chamber defined by a cylinder chamber closed at one end and receiving said piston in sealing and sliding relationship at its other end; and said means for controlling communication of fluid pressure differential in and out of the chamber comprising a restricted orifice, a controllable fluidic connection to a vacuum supply source and means for closing the orifice when the vacuum supply source is controlled so as to be in communication with the chamber.

31. A gas fuel carburetor as claimed in claim 30, wherein said movable part of the valve means and said piston comprise the same element.

* * * * *